United States Patent
Mueller

(10) Patent No.: US 8,700,223 B2
(45) Date of Patent: Apr. 15, 2014

(54) METHOD OF ESTIMATING THE MAXIMUM POWER GENERATION CAPACITY AND FOR CONTROLLING A SPECIFIED POWER RESERVE OF A SINGLE CYCLE OR COMBINED CYCLE GAS TURBINE POWER PLANT, AND A POWER GENERATING SYSTEM FOR USE WITH SAID METHOD

(71) Applicant: ALSTOM Technology Ltd, Baden (CH)

(72) Inventor: Eric Andre Mueller, Zurich (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 13/683,359

(22) Filed: Nov. 21, 2012

(65) Prior Publication Data

US 2013/0074513 A1    Mar. 28, 2013

Related U.S. Application Data

(60) Division of application No. 12/977,523, filed on Dec. 23, 2010, which is a continuation of application No. PCT/EP2009/057444, filed on Jun. 16, 2009.

(30) Foreign Application Priority Data

Jun. 26, 2008 (DE) .......................... 10 2008 002 660
Aug. 14, 2008 (CH) ....................................... 1278/08

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl.
USPC ........................... 700/291; 700/286; 700/295

(58) Field of Classification Search
USPC ........................................ 700/286, 291, 295
See application file for complete search history.

(56) References Cited

U.S. PATENT DOCUMENTS 6,164,057 A    12/2000    Rowen et al.
6,804,612 B2 *   10/2004    Chow et al. .................... 702/34
(Continued)

FOREIGN PATENT DOCUMENTS

| EP | 1 764 486 A1 | 3/2007 |
|---|---|---|
| JP | 2005-216584 A | 8/2005 |

(Continued)

OTHER PUBLICATIONS

International Search Report (PCT/ISA/210) dated Mar. 30, 2010.

(Continued)

*Primary Examiner* — Ronald Hartman Jr
(74) *Attorney, Agent, or Firm* — Buchanan Ingersoll & Rooney PC

(57) ABSTRACT

An estimation unit can estimate, on a real-time basis, a maximum power generation capacity of a single cycle or combined cycle gas turbine power plant. For example, the actual power output and the maximum power generation capacity can be calculated relying on a mathematical process model. Subsequently, the calculated actual power output can be compared with the measured power output yielding a model-estimation error. Based on the model-estimation error, a correction signal can be deduced, to correct the calculated maximum power generation capacity. A controller can maintain a specified power reserve. The controller can use an estimate of the maximum power generation capacity as a reference, subtract a load offset, and apply the resulting signal as upper limit of the load set-point.

18 Claims, 4 Drawing Sheets

(56) References Cited

U.S. PATENT DOCUMENTS

| | | | |
|---|---|---|---|
| 7,305,282 B2* | 12/2007 | Chen | 700/291 |
| 7,454,270 B2* | 11/2008 | Mansingh et al. | 700/291 |
| 7,489,990 B2* | 2/2009 | Fehr et al. | 700/291 |
| 7,689,323 B2* | 3/2010 | Mansingh et al. | 700/286 |
| 7,874,139 B2* | 1/2011 | Briesch et al. | 60/39.464 |
| 8,065,040 B2* | 11/2011 | Kamat et al. | 700/286 |
| 2005/0192915 A1* | 9/2005 | Ahmed et al. | 706/21 |
| 2007/0162189 A1* | 7/2007 | Huff et al. | 700/287 |
| 2007/0240426 A1* | 10/2007 | Wiegman et al. | 60/793 |
| 2008/0004721 A1* | 1/2008 | Huff et al. | 700/48 |
| 2008/0021675 A1* | 1/2008 | Fehr et al. | 702/182 |
| 2008/0087022 A1* | 4/2008 | Briesch et al. | 60/772 |
| 2009/0216387 A1* | 8/2009 | Klein | 700/296 |
| 2010/0023174 A1* | 1/2010 | Nagata et al. | 700/287 |
| 2011/0175443 A1* | 7/2011 | Koyanagi et al. | 307/21 |
| 2011/0215764 A1* | 9/2011 | Takahashi et al. | 320/134 |
| 2013/0035798 A1* | 2/2013 | Zhou et al. | 700/287 |

FOREIGN PATENT DOCUMENTS

| | | |
|---|---|---|
| JP | 2005-523734 A | 8/2005 |
| JP | 2007-232328 A | 9/2007 |
| JP | 2009-246056 A | 10/2009 |

OTHER PUBLICATIONS

English translation of Office Action (Notification of Reasons for Refusal) dated May 27, 2013 issued in corresponding Japanese Patent Application No. 2011-515306.

* cited by examiner

METHOD OF ESTIMATING THE MAXIMUM POWER GENERATION CAPACITY AND FOR CONTROLLING A SPECIFIED POWER RESERVE OF A SINGLE CYCLE OR COMBINED CYCLE GAS TURBINE POWER PLANT, AND A POWER GENERATING SYSTEM FOR USE WITH SAID METHOD

RELATED APPLICATIONS

This application claims priority as a continuation application under 35 U.S.C. §120 to PCT/EP2009/057444, which was filed as an International Application on Jun. 16, 2009 designating the U.S., and which claims priority to German Application 10 2008 002 660.3 filed in Germany on Jun. 26, 2008 and Swiss Application No. 01278/08 filed in Switzerland on Aug. 14, 2008. The entire contents of these applications are hereby incorporated by reference in their entireties.

FIELD

The present disclosure relates to an apparatus and method for estimating the maximum power generation capacity of a single cycle or combined cycle gas turbine power plant on a real-time basis and an apparatus and method for controlling a gas turbine in a single cycle or combined cycle gas turbine power plant such that a specified power reserve of the electric power generator is maintained.

BACKGROUND INFORMATION

Known gas turbine power plants include combined cycle gas turbine power plants and single cycle gas turbine power plants. A combined cycle gas turbine power plant includes components such as a gas turbine, a heat recovery steam generator, a steam turbine, and a generator. The gas turbine is employed as prime mover. It can convert the chemical energy of gaseous or liquid fuel into mechanical energy, exhaust enthalpy, and waste heat. The exhaust enthalpy can be used to generate steam, which can subsequently be expanded in the steam turbine. The steam turbine can produce mechanical power. The gas turbine and the steam turbine can be mechanically coupled to a generator. The generator can convert the mechanical power into electrical power. A variety of different combined cycle power plant configurations exist, for example, single shaft or multi shaft configurations. In a single cycle gas turbine power plant, a gas turbine is used in conjunction with a generator only. The step of recovering the gas turbine's exhaust enthalpy is omitted.

In order to enhance the performance of a gas turbine power plant, a number of power augmentation measures have been developed. An example of such a power augmentation measure is the injection of water into the air intake of the gas turbine's compressor.

In power plants, the electrical power output can be regulated by a control system. In the case of a combined cycle power plant, the power output is the sum of the contribution of the gas turbine and the contribution of the steam turbine. At high loads, the steam turbine can be operated in sliding pressure mode. If the steam turbine is operated in sliding pressure mode, the power output of the plant can be determined by the prevailing operating conditions of the gas turbine. The gas turbine can be controlled by a load/temperature controller. The load/temperature controller receives a load set-point (for example, the manual load set-point entered by the operator) and commands the input variables to the gas turbine (for example, the position of the variable inlet guide vanes, the (mixed) turbine inlet temperatures, the turbine outlet temperature(s)) such that the desired power output can result. The manipulated variables can be adjusted within a predefined range and according to a given operation concept. Moreover, the load/temperature controller may consider additional operation limits. These limits can arise from limiting values of selected power plant process quantities (for example, maximum/minimum temperatures or pressures). Maximum power output (also referred to as base load) results when the manipulated variables take their base load values.

The power generated by the plant can be sold to a customer and delivered to the electrical grid for distribution. In order to be able to efficiently dispatch the electricity, it is useful for the operator of the plant to know the maximum power generation capacity. However, in a single cycle or combined cycle gas turbine power plant, the maximum power generation capacity is generally unknown because it is highly dependent on the ambient conditions at the power plant (for example, ambient temperature, ambient pressure, ambient humidity) and other variable factors, such as fuel type and quality (for example, caloric value), heat soaking of the components, aging, dirt.

Among known methods, no simple method (for example, a method of low computational complexity) exists to accurately estimate on a real-time basis the maximum power generation capacity of a single cycle or combined cycle gas turbine power plant.

Knowledge about the maximum power generation capacity is not only valuable for dispatching but can be similarly useful when the power plant operator is asked by the customer (or is contractually obliged by the grid authority) to maintain a specified power capacity in reserve. Such a power reserve is, for example, used in order to provide frequency support. The specification of the power reserve may involve a static requirement (for example, to provide a power capacity of a given MW figure) as well as a transient requirement (for example, to provide the power capacity with a minimum average loading gradient). The specification can be formulated in terms of a desired power capacity and a desired maximum time within which the desired power capacity has to be provided.

Due to internal dynamics, a power plant is not able to immediately follow an increase in demanded power. If the steam turbine is operated in sliding pressure mode, the response of the steam turbine is slower than the response of the gas turbine. These different time constants explicitly have to be accounted for if a desired power reserve is to be maintained. Where the specified loading gradients can be met only by the gas turbine, the controller keeps in reserve a total power capacity that is larger than the power capacity specified.

In the U.S. Pat. No. 6,164,057, a controller is disclosed that operates a gas turbine such that a desired power generation capacity can be maintained in reserve. The inlet guide vane angle of the compressor is applied as an indicator of the reserve capacity of the gas turbine. The proposed controller can continuously compare the actual inlet guide vane angle to an intended inlet guide vane angle that corresponds to a desired reserve capacity. A controller can adjust the fuel flow to the gas turbine to adjust the turbine output power and thereby maintain the actual inlet guide vane angle at the intended value corresponding to the desired reserve capacity.

In the U.S. Pat. No. 6,164,057 the inlet guide vane controller asymptotically compensates the reserve capacity controller's response for frequency support. As a consequence, the method applies exclusively for environments where only short-term frequency support is desired.

Due to the action of the inlet guide vane controller, the power output of the gas turbine generator is independent of the manual load set-point on a long-term basis. As a consequence, the gas turbine generator cannot be operated at a settable load while the reserve capacity controller is active.

The inlet guide vane angle is proposed to be a good indicator of the reserve capacity of the gas turbine. This correlation is assumed to be relatively independent of disturbances, such as changing ambient conditions. However, the bandwidth of the inlet guide vane controller has to be set comparably small in order not to interfere with the control actions of the speed/load governor. As a consequence, only low-frequency disturbances are rejected.

SUMMARY

A method of estimating the maximum power generation capacity of a gas turbine power plant is disclosed. A controller regulates an operation of the power plant. The method includes calculating an actual power output and a maximum power generation capacity of the gas turbine power plant based on a mathematical model of the gas turbine power plant, measuring the actual power output of the gas turbine power plant, comparing the calculated actual power output and the measured power output to derive a model-estimation error, processing the model-estimation error to generate a correction signal, and applying the correction signal to the calculated maximum power generation capacity to obtain a corrected estimate of the maximum power generation capacity of the gas turbine power plant.

A method for controlling a specified power reserve of a gas turbine power plant is disclosed. An input means generates a load set-point signal for the gas turbine power plant. A controller receives the load set-point signal and regulates a power output of the gas turbine power plant. The method includes continuously updating an estimate of the maximum power generation capacity of the gas turbine power plant, calculating a load offset by specifying a power reserve and determining the load offset from the specified power reserve, calculating a load limit as a difference of the estimate of the maximum power generation capacity and the load offset, and applying the load limit as an upper limit of the load set-point signal to obtain a limited load set-point signal.

A power generating system including a gas turbine power plant is disclosed. A controller regulates operation of the gas turbine power plant. An estimation unit calculates an actual power output and a maximum power generation capacity of the gas turbine power plant based on a mathematical model of the gas turbine power plant, measures the actual power output of the gas turbine power plant, compares the calculated actual power output and the measured power output to derive a model-estimation error, processes the model-estimation error to generate a correction signal, applies the correction signal to the calculated maximum power generation capacity to obtain a corrected estimate of the maximum power generation capacity of the gas turbine power plant, and continuously provides an estimate of the maximum power generation capacity of the gas turbine power plant.

A power generating system, including a gas turbine power plant is disclosed. An input means generates a load set-point signal for the gas turbine power plant. A controller receives the load set-point signal and regulates the power output of the gas turbine power plant. An input means specifies a power reserve. The controller operates the gas turbine power plant such that the specified power reserve is maintained, uses a continuously updated estimate of the maximum power generation capacity of the gas turbine power plant, calculates a load offset by specifying a power reserve and for determining the load offset from the specified power reserve, calculates a load limit as a difference of the estimate of the maximum power generation capacity and the load offset, and applies the limit as an upper limit of the load set-point signal to obtain a limited load set-point signal.

DETAILED DESCRIPTION

Exemplary embodiments of the disclosure relate to a method of estimating the maximum power generation capacity of a single cycle or combined cycle gas turbine power plant, and to a power generating system including a single cycle or combined cycle power plant and an estimation unit for estimating on a real-time basis the maximum power generation capacity of the power plant.

An exemplary embodiment of the disclosure relates to a method for operating a single cycle or combined cycle gas turbine power plant such that a specified power reserve can be maintained.

An exemplary embodiment of the disclosure relates to a power generating system including a single cycle or combined cycle power plant and a control apparatus that operates the power plant such that a specified power reserve can be maintained.

Figure 1:
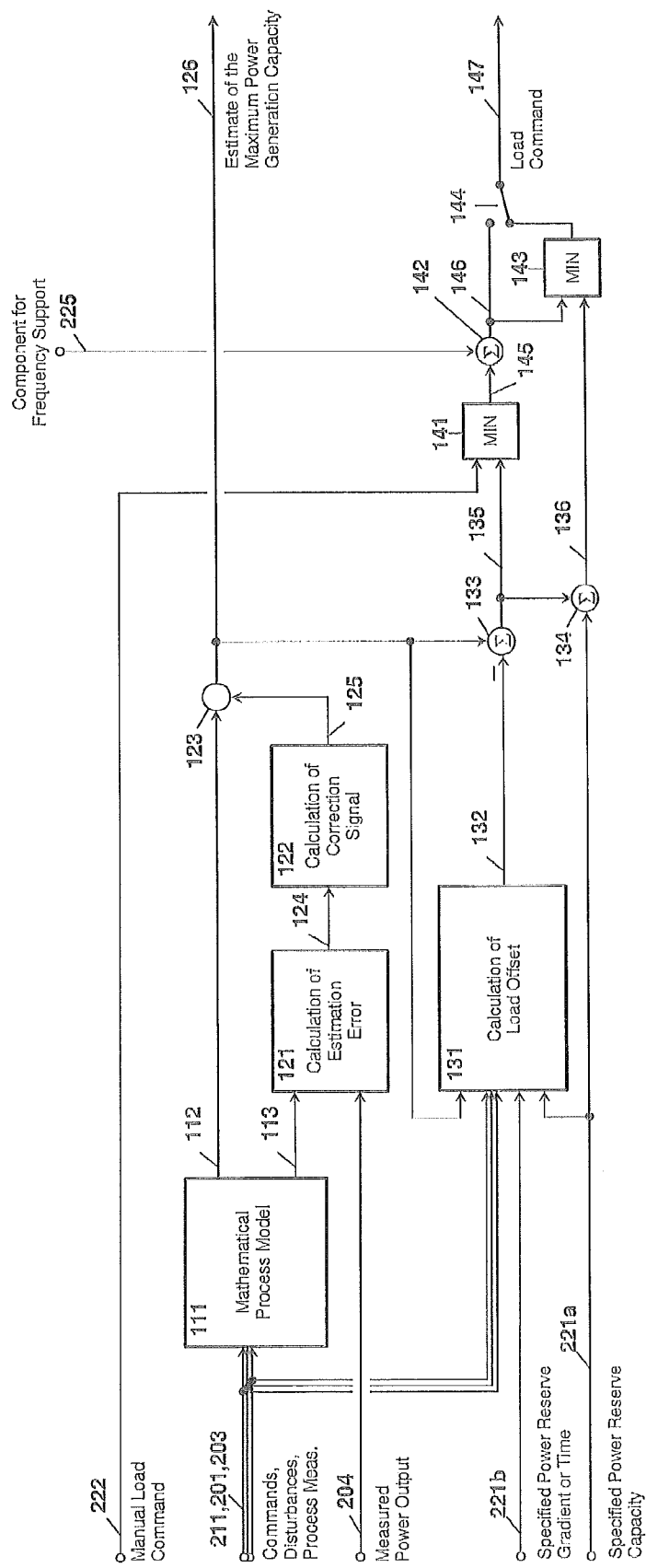
FIG. 1 shows in a block control diagram the elements of an exemplary embodiment of the disclosure.

In the following, a functional description of the disclosure is given. The elements of an exemplary embodiment of the disclosure are shown in the schematic overview of FIG. 1. First, the method of estimating the maximum power generation capacity of a single cycle or combined cycle gas turbine power plant is described. According to an exemplary embodiment of the disclosure, the method can include:

(1a) calculating the actual power output (the expected power output at the current operating point) 113 and the expected maximum power generation capacity 112 based on a mathematical model 111 of the single cycle or combined cycle gas turbine power plant. The calculation can rely on an input vector, which may include load/temperature controller commands 211, measured disturbance signals 201, and power plant process measurements 203;

(1b) measuring the actual power output of the single cycle or combined cycle gas turbine power plant;

(1c) comparing the calculated actual power output 113 and the measured power output 204 to derive a model-estimation error 124;

(1d) processing the model-estimation error 124 to generate a correction signal 125; and (1e) applying 123 the correction signal 125 to the calculated maximum power generation capacity 112 to obtain a corrected estimate of the maximum power generation capacity 126 of the single cycle or combined cycle gas turbine power plant.

Available information at the input and at the output of the system (the power plant) can be used to assess the maximum power generation capacity, which is an internal system property. The mathematical model 111 can be a control-oriented and dynamic representation of the process. In a generic case, the model can consider commands of the load/temperature controller, the influence of measurable disturbances, and the existence of operational limits. Load/temperature controller inputs can be used in the model to calculate the actual power output. Measured disturbance signals can be used in the model to consider the influence of various disturbances on the actual power output and the maximum power generation capacity. Power plant process measurements can be used in the model to include the impact of different operating limits on the calculation of the maximum power generation capacity. The influence of non-measured disturbances can be accounted for within steps (1c), (1d), and (1e), where in step (1d) a separation of low-frequency effects and high-frequency effects can be possible. Below, exemplary embodiments referring to steps (1a) to (1e) are given.

In an exemplary embodiment, the input vector to the mathematical model 111 can include signals such as the commanded position of variable inlet guide vanes, the commanded mixed turbine inlet temperature(s), the measured gas turbine compressor inlet temperature, the measured coolant temperature of the steam turbine condenser, information about the fuel type, information about the fuel quality, feedback signals from power augmentation measures, the measured gas turbine compressor outlet temperature, the measured gas turbine compressor outlet pressure, and the measured turbine exhaust temperature.

Two exemplary embodiments are given for the steps (1c) and (1e).

According to an exemplary embodiment, step (1c) can be implemented by calculating the quotient of the measured power output 204 and the calculated actual power output 113, yielding a multiplicative model-estimation error 124. In step (1e), the calculated maximum power generation capacity 112 can then be multiplied by the correction signal 125 to obtain a corrected estimate of the maximum power generation capacity 126 of the single cycle or combined cycle gas turbine power plant.

According to an exemplary embodiment, step (1c) can be implemented by calculating the difference of the measured power output 204 and the calculated actual power output 113, yielding an additive model-estimation error 124. In step (1e), the correction signal 125 can then be added to the calculated maximum power generation capacity 112 to obtain a corrected estimate of the maximum power generation capacity 126 of the single cycle or combined cycle gas turbine power plant.

In an exemplary embodiment of step (1d), the model-estimation error 124 can be separated by dynamic filtering into a low-frequency part and a high-frequency part, where the low-frequency part can subsequently be used as correction signal 125.

In the following, a description is provided of an exemplary embodiment of a method for operating a single cycle or combined cycle gas turbine power plant such that a specified power reserve can be maintained. According to the disclosure, the method can include:

(2a) using an estimate 126 of the maximum power generation capacity of the single cycle or combined cycle gas turbine power plant as reference;
(2b) calculating a load offset 132 based on the specification of a power reserve, where the specification includes a static requirement 221a and a transient requirement 221b;
(2c) calculating a load limit 135 as the estimated maximum power generation capacity 126 minus the load offset 132;
(2d) calculating a load limit 136 as the sum of the limit 135 and the desired power capacity 221a;
(2e) applying limit 135 as an upper limit of the manual load set-point 222 to yield a (limited) load set-point signal 145;
(2f) optionally applying (switch 144) the limit 136 as an upper limit of the load command 146 which is the (limited) manual load set-point 145 plus the load component 225 for frequency support; and
(2g) feeding the resulting load command 147 to the input of a conventional load controller.

The exemplary method for controlling a specified power reserve can perform the power reserve control action on a control-hierarchic level of load commands. A reference load is an estimate of the maximum power generation capacity. This value can be calculated as described above by estimating the maximum power generation capacity of a single cycle or combined cycle power plant. If the power reserve controller is enabled, the manual load set-point is limited by the load limit and the specified power reserve can be maintained. This approach allows the power plant to be operated at a settable load even if the power reserve controller is active (provided that the manual load set-point is smaller than the calculated load limit). Further, no assumption about the temporal behaviour of the grid frequency is necessary, because frequency response action does not bias the calculation of the power reserve load limits. The calculation of a load offset in step (2b) can be used in order to account for possible slow components in the power response. Slow components that do not meet the transient power reserve specification can be held in reserve on top of the specified reserve capacity.

For step (2d), an exemplary embodiment is given in the following. According to this embodiment, the load offset 132 can be calculated based on a desired power capacity 221a, a transient requirement 221b (such as a desired minimum average power reserve loading gradient or a desired maximum time within which the desired power capacity has to be provided), an input vector, which may include load/temperature controller commands 211, measured disturbance signals 201, and power plant process measurements 203, further based on the estimate 126 of the maximum power generation capacity, and on model assumptions. The desired power capacity 221a may be specified as absolute figure (in MW) or as a fixed percentage of the maximum power generation capacity.

In the following, the exemplary embodiment can be implemented for a combined cycle power plant with a gas turbine with sequential combustion. The method of estimating the maximum power generation capacity is explained hereafter as part of the method for controlling a specified power capacity.

Figure 2:
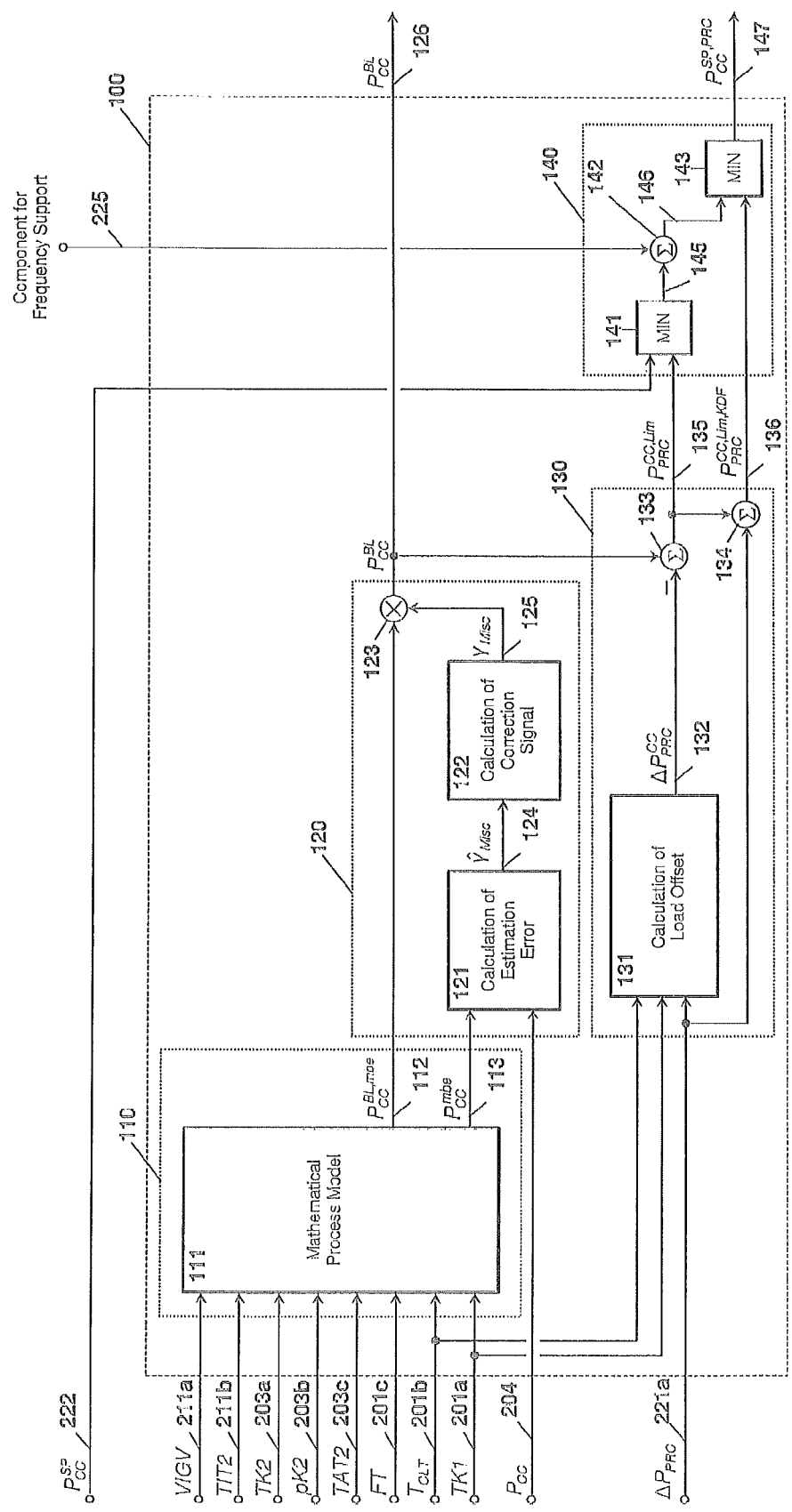
FIG. 2 shows in a block control diagram the internal structure of an exemplary embodiment of the disclosure.

In FIG. 2, a block diagram of the internal structure of an exemplary embodiment 100 of the power reserve controller is shown. The controller includes of four major units. A model-based estimation unit 110, a measurement-based correction unit 120, a unit 130 for the calculation of the power reserve load limits, and a unit 140 which processes the load limits. Key functions of the units 110, 120, 130, and 140 are:

model-based estimation unit 110 for continuous calculation of the maximum power generation capacity of the plant 112 ($P_{CC}^{BL,mbe}$), and of the actual power output of the plant 113 ($P_{CC}^{mbe}$);
measurement-based correction (adaptation) unit 120 for correction of the calculated maximum power generation capacity 112 ($P_{CC}^{BL,mbe}$) in order to account for the influence of non-measured disturbances and modelling errors;

power reserve load limits calculation unit 130 for calculation of the power reserve load limits 135 and 136 ($P_{PRC}^{CC,Lim}$ and $P_{PRC}^{CC,Lim,KDF}$);

load limits processing unit 140 for processing of the load limits 135 and 136 to obtain the load command 147 ($P_{CC}^{SP,PRC}$), that is subsequently fed to the input of a load controller.

The unit 110 involves a mathematical process model 111. In order to facilitate low computational complexity, the mathematical model is control-oriented, hence a concise description of the system is given. The mathematical model 111 can use the disturbance signals 201a (TK1) and 201b ($T_{CLT}$), the load controller commands 211a (VIGV) and 211b (TIT2), information about the fuel type 201c (FT), and the power plant process measurements 203a, 203b, and 203c (TK2, pK2, TAT2) to assess the current power output of the plant 112 ($P_{CC}^{BL,mbe}$) and the maximum power generation capacity 113 ($P_{CC}^{mbe}$). From the comparison of the actual (measured) power output 204 ($P_{CC}$) with the calculated value of the current power output 113 ($P_{CC}^{mbe}$), a correction signal $\gamma_{Misc}$ be determined in unit 120. This correction signal can subsequently be used to update the calculated value 112 ($P_{CC}^{BL,mbe}$), yielding an adapted estimate 126 ($P_{CC}^{BL}$) of the maximum power generation capacity of the plant. The estimate 126 ($P_{CC}^{BL}$) can be used internally but also provided as an output of the power reserve controller. A load offset 132 ($\Delta P_{PRC}^{CC}$) can be calculated in 131 and subsequently subtracted 133 from the estimated maximum power generation capacity 126 ($P_{CC}^{BL}$). The resulting load signal 135 ($P_{PRC}^{CC,Lim}$) can be used in unit 140 as power reserve load limit. The signal 136 ($P_{PRC}^{CC,Lim,KDF}$) is the sum 134 of the limit 133 ($P_{PRC}^{CC,Lim}$) and the desired power capacity 221a ($\Delta P_{PRC}$). It is processed in unit 140 to cap 143 the final power reserve load command 147 ($P_{CC}^{SP,PRC}$). The load range between the limits 135 ($P_{PRC}^{CC,Lim}$) and 136 ($P_{PRC}^{CC,Lim,KDF}$) is reserved for frequency support 225.

Figure 3:
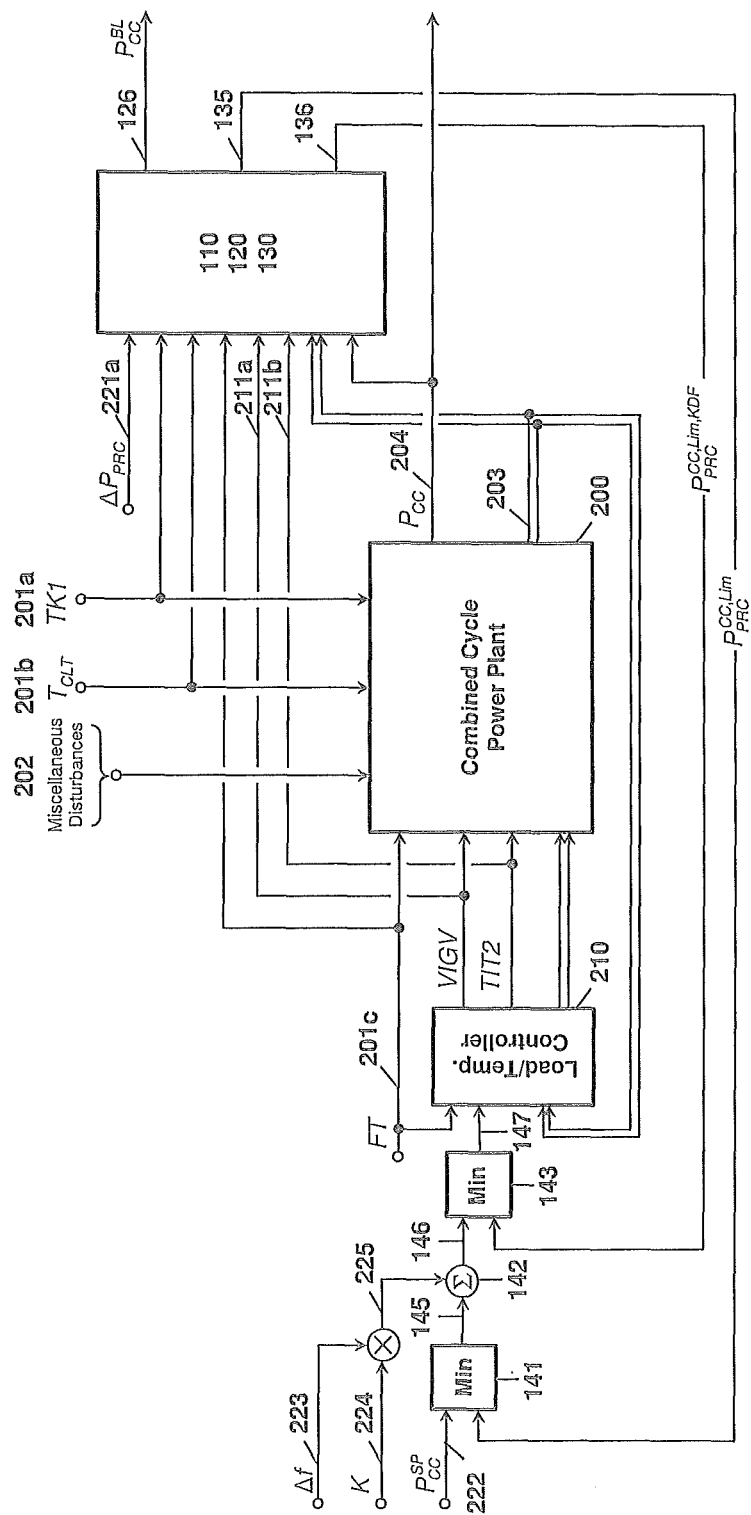
FIG. 3 shows in a block control diagram the load/temperature control of a combined cycle power plant with an exemplary embodiment of the disclosure.

FIG. 3 shows a schematic of the integration of an exemplary embodiment of the power reserve controller (including the units 110, 120, 130, 140) into the control logic of a combined cycle gas turbine power plant 200. The signals used in the power reserve controller can include the control variables 211a (VIGV) and 211b (TIT2) of the load/temperature controller 210, information about the fuel type 201c (FT), the measurable disturbance signals 201a and 201b (TK1 and $T_{CLT}$), the power plant process measurements 203 (TK2, pK2, TAT2), the measured power output 204 ($P_{CC}$), and the desired power capacity 221a ($\Delta P_{PRC}$). If enabled, the power reserve controller can limit the manual load set-point 222 ($P_{CC}^{SP}$) to the power reserve control load margin 135 ($P_{PRC}^{CC,Lim}$). This can be accomplished with the minimum value selector 141. The resulting reserve in power capacity can be provided for frequency support. The load component for frequency support 225 can be determined from a frequency deviation 223 ($\Delta f$) and a power gain factor 224 (K). The component 225 can be added at the summation node 142. Frequency support is limited 143 at the load margin 136 ($P_{PRC}^{CC,Lim,KDF}$). The final load command 147 ($P_{CC}^{SP,PRC}$) can eventually be fed to the load/temperature controller 210.

In the following paragraphs, more details are provided about the structure of the mathematical model, the calculation of the correction signal, and about the calculation of the required load offset.

According to an exemplary embodiment of the mathematical model, the individual contributions of the gas turbine and of the steam turbine to the overall power output can be assessed separately. The quasi-static power output of the gas turbine, $P_{GT}^{QS,mbe}$, follows from the following equation:

$$P_{GT}^{QS,mbe} = P_{GT,Nom} \cdot \gamma_{TK1}(TK1) \cdot \gamma_{VIGV}(VIGV) \cdot \gamma_{TIT2}(TIT2). \quad (1)$$

The parameter $P_{GT}^{Nom}$ is a nominal base load power output, which can be calculated for a reference set of ambient and boundary conditions. The three functions $\gamma_{TK1}(TK1)$, $\gamma_{VIGV}(VIGV)$, and $\gamma_{TIT2}(TIT2)$ can be used to scale the nominal power output. The first factor corrects the nominal power output for changing compressor inlet temperatures, TK1. The factors $\gamma_{VIGV}(VIGV)$ and $\gamma_{TIT2}(TIT2)$ approximate the relative influence on the gas turbine power output of the position of the variable inlet guide vanes, VIGV, and of the mixed inlet temperature of the low pressure turbine, TIT2. Additionally, the factors $\gamma_{VIGV}(VIGV)$ and $\gamma_{TIT2}(TIT2)$ are functions of the fuel type used, FT. The quasi-static function (1) can be augmented in this aspect of the mathematical model with a first-order element of time constant $T_{PWR}^{GT}$, to obtain an estimation $P_{GT}^{mbe}$ of the actual gas turbine power output.

$$P_{GT}^{mbe} = \sum_{PWR}^{GT}(s) \cdot P_{GT}^{QS,mbe} \quad (2)$$

$$\Sigma_{PWR}^{GT}(s) = \frac{1}{T_{PWR}^{GT} \cdot s + 1} \quad (3)$$

In a combined cycle power plant, the steam turbine power output and the gas turbine power output are coupled, because the power output of the steam turbine is a function of the gas turbine exhaust enthalpy flow rate. In an embodiment of the model, the power output of the steam turbine, $P_{ST}^{mbe}$, can be defined as a dynamic function of the control variables VIGV and TIT2 and of the steam turbine condenser inlet temperature, $T_{CLT}$. The total power output of the combined cycle system, $P_{CC}^{mbe}$, simply results as the sum of the component's power outputs, $P_{GT}^{mbe}$ and $P_{ST}^{mbe}$, respectively.

$$P_{CC}^{mbe} = P_{GT}^{mbe} + P_{ST}^{mbe} \quad (4)$$

In order to assess the maximum power generation capacity, the base load values of the control signals VIGV and TIT2 have to be known. During operation, these base load positions are continuously computed and adjusted by the load/temperature controller. The base load value of VIGV can be a function of the type of fuel used, FT, of the compressor outlet temperature, TK2, and of the compressor outlet pressure, pK2. The base load value of TIT2 can be dependent on the compressor intake temperature, TK1, the fuel type used, FT, the base load position of VIGV, and the operating limit of the low pressure turbine outlet temperature, TAT2. Correlations between TK2, pK2, TAT2 and VIGV, and between TAT2 and TIT2 were derived. These correlations are used in the model to predict the base load positions of VIGV and TIT2. In order to calculate the maximum power generation capacity, $P_{CC}^{BL,mbe}$, these base load positions are then substituted for VIGV and TIT2 in the equations of the model.

The power output of a combined cycle power plant can be subject to numerous disturbances, such as varying ambient conditions, changing operating conditions or transient system states. Some of these effects do not enter the model equations. In order to assess the impact of these disturbances, feedback information from the system is retrieved. Accessible information can be contained in the measurement of the actual combined cycle power output, $P_{CC}$. If the disturbances are assumed to be of "multiplicative form," the model-estimation error is given by the following quotient:

$$\hat{\gamma}_{Misc} = \frac{P_{CC}}{P_{CC}^{mbe}}. \quad (5)$$

The quotient $\tilde{\gamma}_{Misc}$ captures high-frequency as well as low-frequency modelling errors. The high-frequency part can stem from deviations in the modelled gas turbine load dynamics or are the result of measurement noise. Low-frequency disturbances can originate from slow dynamics, for example, thermal transients, ageing, or changing ambient conditions. The disturbances are separated into low-frequency and high-frequency contributions by applying a filter operation to the quotient $\tilde{\gamma}_{Misc}$. The low-frequency disturbances are extracted as $$\gamma_{Misc} = \frac{1}{T_{ADP} \cdot s + 1} \cdot \hat{\gamma}_{Misc}. \quad (6)$$

The parameter $T_{ADPT}$ is the time constant of a low-pass filter. The frequency $(2\pi \cdot T_{ADPT})^{-1}$ separates the "slow" from the "fast" disturbances. The calculated maximum power generation capacity is only corrected for the slow disturbances. This model adaptation is performed by the multiplication of the model-based estimate, $P_{CC}^{BL,mbe}$, with the correction signal $\gamma_{Misc}$, $$P_{CC}^{BL,mbe} = \gamma_{Misc} \cdot P_{CC}^{BL,mbe}. \quad (7)$$

The resulting quantity, $P_{CC}^{BL}$, is the corrected estimate of the maximum power generation capacity of the combined cycle power plant.

Figure 4:
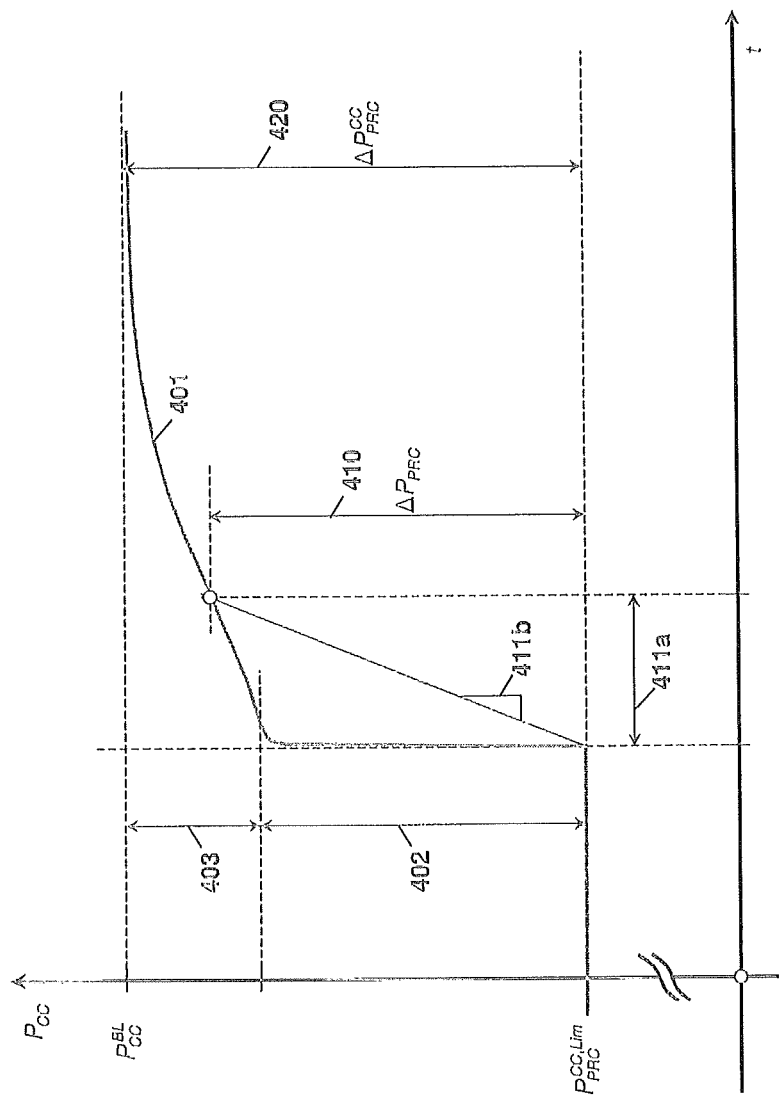
FIG. 4 shows in a schematic, the response, of a combined cycle power plant of an exemplary embodiment of the disclosure with the steam turbine in sliding pressure mode, to a step in the commanded load.

The estimated maximum power generation capacity can be used by the power reserve controller as a reference load. From this reference load, a required load offset can be subtracted to obtain the power reserve load limit. The calculation of the load offset can be based on the specification of the power reserve and on model assumptions concerning the dynamic properties of components involved. The specification of the power reserve can involve a static requirement as well as a transient requirement. In the exemplary embodiment, the static requirement can be defined so as to provide a desired power capacity of a given MW figure. The transient requirement can be defined in terms of a desired minimum average loading gradient. In FIG. 4, a response of the plant power output 401 to a step in the commanded load is sketched. Due to internal dynamics, the power plant is not able to immediately follow an increase in demanded power. The power response includes a fast part 402 (contribution of the gas turbine) and a slow part 403 (contribution of the steam turbine). Also shown in FIG. 4 are the power reserve specifications 410, 411a, and 411b. The transient requirements (either given by a desired maximum time 411a or a desired minimum average loading gradient 411b) necessitate the controller to keep in reserve a total power capacity 420 that is larger than the power capacity specified 410. If the transient requirement is stringent, the required loading gradient can be met only by the gas turbine.

In an exemplary embodiment, the desired power capacity can be assumed to be provided exclusively by the gas turbine. Accordingly, the load offset 420 ($\Delta P_{PRC}^{CC}$) follows as $$\Delta P_{PRC}^{CC} \approx \Delta P_{PRC} \cdot \left(1 + \frac{\Delta P_{ST}^{QS}}{\Delta P_{GT}^{QS}}\right) \quad (8)$$

where $\Delta P_{PRC}$ is the specified power capacity 410, $\Delta P_{GT}^{QS}$ the contribution of the gas turbine 402, and $\Delta P_{ST}^{QS}$ the contribution of the steam turbine 403.

Finally, the upper limit for the manual load set-point (the power reserve load limit) is computed as $$P_{PRC}^{CC,Lim} = P_{CC}^{BL} - \Delta P_{PRC}^{CC} \quad (9)$$

and the optional second limit for the load command follows as $$P_{PRC}^{CC,Lim,KDF} = P_{PRC}^{CC,Lim,KDF} + \Delta P_{PRC}. \quad (10)$$

The controller 100 and its constituent elements, can be implemented on a microprocessor coupled to a memory. All the method steps described herein may be performed on a microprocessor coupled to a memory.

The disclosure is not limited to the embodiments described above. Variations and changes may be made from the disclosed embodiment without departing from the disclosure as set forth in the claims.

Thus, it will be appreciated by those having ordinary skill in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| Nomenclature | |
|---|---|
| (An integrating component of the application) | |
| FT | Signal that defines the type of fuel used |
| Δf | Frequency error (Hz) |
| $\gamma_{Misc}$ | Correction signal |
| $\hat{\gamma}_{Misc}$ | Model estimation error |
| K | Power gain factor (MW/Hz) |
| $P_{CC}$ | Measured power output of the plant (MW) |
| $P_{CC}^{BL}$ | Estimated maximum power generation capacity of the plant (MW) |
| $P_{CC}^{SP}$ | Manual load set-point (MW) |
| $P_{CC}^{mbe}$ | Model-based estimate of the actual power output (MW) |
| $P_{CC}^{BL,mbe}$ | Model-based estimate of the maximum power generation capacity (MW) |
| $P_{PRC}^{CC,Llm}$ | Power reserve control load limit (MW) |
| $P_{PRC}^{CC,Llm,KDF}$ | Power reserve control load limit (MW) |
| $P_{CC}^{SP,PRC}$ | Load command fed to load controller (MW) |
| $\Delta P_{PRC}$ | Specified power capacity (MW) |
| $\Delta P_{PRC}^{CC}$ | Load offset (MW) |
| pK2 | Measured gas turbine compressor outlet pressure (barg) |
| TAT2 | Measured turbine exhaust temperature of low pressure turbine (° C.) |
| TIT2 | Commanded mixed turbine inlet temperature of low pressure turbine (° C.) |
| TK1 | Measured gas turbine compressor inlet temperature (° C.) |
| TK2 | Measured gas turbine compressor outlet temperature (° C.) |
| $T_{CLT}$ | Measured coolant temperature of steam turbine condenser (° C.) |
| VIGV | Commanded position of variable inlet guide vanes (°) |

What is claimed is:

1. A method for controlling a specified power reserve of a gas turbine power plant having an input means which generates a load set-point signal for the gas turbine power plant and a controller which receives the load set-point signal and regulates a power output of the gas turbine power plant, the method comprising:
arranging a processor coupled to a memory to:
continuously update an estimate of the maximum power generation capacity of the gas turbine power plant;
calculate a load offset by specifying a power reserve and determining the load offset from the specified power reserve;
calculate a load limit as a difference of the estimate of the maximum power generation capacity and the load offset; and
apply the load limit as an upper limit of the load set-point signal to obtain a limited load set-point signal.

2. A method according to claim 1, wherein the estimate of the maximum power generation capacity is calculated by:
arranging the processor to,
calculate an actual power output and a maximum power generation capacity of the gas turbine power plant based on a mathematical model of the gas turbine power plant;
measure the actual power output of the gas turbine power plant;
compare the calculated actual power output and the measured power output to derive a model-estimation error;
process the model-estimation error to generate a correction signal; and
apply the correction signal to the calculated maximum power generation capacity to obtain a corrected estimate of the maximum power generation capacity of the gas turbine power plant.

3. A method according to claim 1, wherein the calculating of the load offset relies on model assumptions which consider dynamic properties of the gas turbine power plant.

4. A method according to claim 1, wherein the calculating of the load offset relies on an input vector that comprises one or more of the manipulated variables of the controller, which regulates the power output of the gas turbine power plant.

5. A method according to claim 1, wherein the calculating of the load offset relies on an input vector that comprises signals indicative of disturbances.

6. A method according to claim 1, wherein the calculating of the load offset relies on an input vector that comprises power plant process measurements.

7. A method according to one of the claim 1, wherein the calculating of the load offset relies on at least one of a signal indicative of gas turbine compressor inlet temperature, and a signal indicative of coolant temperature of the steam turbine condenser.

8. A method according to claim 1, wherein the specifying of a power reserve includes:
specifying a quantity indicative of a desired maximum time within which a desired power capacity has to be provided.

9. A method according to claim 1, wherein the specifying of a power reserve includes:
specifying a desired power capacity which is defined as a constant value.

10. A method according to claim 1, wherein the specifying a power reserve includes:
a specification of a desired power capacity which is defined as a fixed percentage of the estimate of the maximum power generation capacity.

11. A method according to claim 1, comprising:
generating a load signal by adding a load component for frequency support to the limited load set-point signal; and
using use the signal obtained as an input for the controller, which receives a load set-point signal and regulates the power output of the gas turbine power plant.

12. A method according to claim 9, comprising:
calculating a second load limit as a sum of the load limit and the desired power capacity;
generating a load signal by adding a load component for frequency support to the limited load set-point signal;
applying the second load limit as an upper limit of the load signal to obtain a signal; and
using the signal obtained as an input for the controller, which receives a load set-point signal and regulates the power output of the gas turbine power plant.

13. A method according to claim 1, wherein the gas turbine power plant is of single cycle type.

14. A method according to claim 1, wherein the gas turbine power plant is of combined cycle type.

15. A power generating system, comprising:
a gas turbine power plant;
an input means for generating a load set-point signal for the gas turbine power plant;
a controller for receiving the load set-point signal and for regulating the power output of the gas turbine power plant; and
an input means for specifying a power reserve;
wherein the controller is configured for:
operating the gas turbine power plant such that the specified power reserve is maintained;
using a continuously updated estimate of the maximum power generation capacity of the gas turbine power plant;
calculating a load offset by specifying a power reserve and for determining the load offset from the specified power reserve;
calculating a load limit as a difference of said estimate of the maximum power generation capacity and said load offset; and
applying said limit as an upper limit of said load set-point signal to obtain a limited load set-point signal.

16. A power generating system according to claim 15, comprising:
a display for displaying to an operator of the power plant, the calculated load limit.

17. A power generating system according to claim 15, wherein the gas turbine power plant is of single cycle type.

18. A power generating system according to claim 15, wherein the gas turbine power plant is of combined cycle type.

* * * * *